United States Patent
Yu

(12) 
(10) Patent No.: US 6,217,307 B1
(45) Date of Patent: Apr. 17, 2001

(54) SPRING SPACER FOR BLADDER ASSEMBLY IN A TIRE CURING PRESS

(75) Inventor: Wei Yu, Fresno, CA (US)

(73) Assignee: Pirelli Tire LLC, Hanford, CA (US)

( * ) Notice: Subject to any disclaimer, the term of this patent is extended or adjusted under 35 U.S.C. 154(b) by 0 days.

(21) Appl. No.: 09/290,312

(22) Filed: Apr. 12, 1999

(51) Int. Cl.[7] .................................................. B29C 35/02
(52) U.S. Cl. .................................. 425/48; 425/52; 425/58
(58) Field of Search ................................ 425/43, 48, 52, 425/58

(56) References Cited

U.S. PATENT DOCUMENTS

| | | | |
|---|---|---|---|
| 2,320,240 | * | 5/1943 | Janiszewski . |
| 2,736,059 | * | 2/1956 | Frank . |
| 2,901,772 | * | 9/1959 | Frohlich et al. . |
| 3,770,221 | * | 11/1973 | Stern . |
| 3,976,409 | * | 8/1976 | Athey ..................................... 425/48 |
| 4,114,529 | * | 9/1978 | Furmaga ................................ 100/53 |
| 4,377,084 | * | 3/1983 | Kaminski ............................... 72/325 |
| 4,508,498 | * | 4/1985 | Collmann .............................. 425/58 |
| 4,670,209 | * | 6/1987 | Nakagawa et al. .................... 425/48 |
| 4,846,649 | * | 7/1989 | Hasegawa et al. .................... 425/33 |
| 4,872,822 | * | 10/1989 | Pizzorno ................................ 425/48 |
| 5,149,545 | * | 9/1992 | Sakaguchi et al. .................... 425/35 |
| 5,340,047 | * | 8/1994 | Heller ................................ 242/599.1 |
| 5,374,008 | * | 12/1994 | Halvorson et al. ............... 242/598.3 |
| 5,393,480 | * | 2/1995 | Pizzorno ............................. 264/315 |
| 5,522,716 | * | 6/1996 | Ureshino ............................... 425/48 |

\* cited by examiner

Primary Examiner—James P. Mackey
(74) Attorney, Agent, or Firm—St. Onge Steward Johnston & Reens LLC

(57) ABSTRACT

Spacers for bladder assemblies for standing post tire curing presses and bladder assemblies for same are provided having a spacer with first and second parts biased by a spring, so that they are freely slidable relative to one another so as to cover the center post of the tire curing press during its operation.

15 Claims, 2 Drawing Sheets

SPRING SPACER FOR BLADDER ASSEMBLY IN A TIRE CURING PRESS

FIELD OF THE INVENTION

This invention relates to spacers for standing post tire presses and to bladder assemblies for standing post tire curing presses.

BACKGROUND OF THE INVENTION

Conventional standing post tire curing presses typically comprise a bladder assembly and a tire mold assembly. The bladder assembly typically has a bladder, a standing center press post and upper and lower clamp ring assemblies that clamp the tire and oppose each other so as to support both sides of the tire. By way of definition, "opposing clamp ring assemblies" is understood to mean clamp ring assemblies that are opposite each other along the center post. The upper clamp ring assembly includes an upper mold ring and an upper clamp ring. The lower clamp ring assembly includes a lower bead ring and a lower clamp ring.

In a conventional tire curing process, the bladder clamp ring assemblies and spacer are moved relative to each other and pressure or vacuum is applied depending upon the point in the tire curing process. First, a loader loads a green tire assembly over the center post of the bladder assembly so that the lower tire bead is adjacent to the lower bead ring with the upper clamp ring assembly raised up to its fully extended position, also known as the "primary stacking height", and with a vacuum being applied to the bladder. Typically, the upper clamp ring assembly is fixed to the center post utilizing a collar. Thus, to raise the upper clamp ring, the center post is extended from the well.

Once the green tire assembly is loaded, the vacuum is typically broken and the upper clamp ring is dropped on a fixed-height spacer. The point to which the upper clamp ring is dropped to rest on the spacer is known as the "secondary stacking height." A shaping pressure is applied to pre-shape the tire. The tire loader will release after the tire is pre-shaped. Then the tire mold assembly is closed around the green tire and the spacer travels further down the center post to the well.

During unloading of the cured tire, the bladder assembly is raised up along the center post so that stripping arms may be inserted adjacent to the lower bead ring and side wall of the tire. As the stripping arms are moved into position, the upper clamp ring is moved upward to its primary stacking height with the bladder being relaxed. Then, a vacuum is applied and the bladder assembly is lowered to the bottom side wall of the tire mold. Then the vacuum is broken, and the upper clamp ring is dropped to its secondary stacking height. The stripping arms are tilted releasing the cured tire to the back of the press.

While the above steps are the typical steps involved in curing a tire using a tire curing press having a standing center post, other sequences or the omission or addition of steps are contemplated and understood to be incorporated in this disclosure.

Conventionally, a tubular, fixed height spacer is placed over the center post and rests on the center mechanism adjacent to the lower clamp ring assembly to limit the extent to which the upper clamp ring assembly drops as it moves toward the lower clamp ring assembly. "Fixed height spacer" is understood to mean a spacer that maintains is overall height throughout the curing process.

Bladders are frequently pinched during the curing process when conventional fixed height spacers are used. The dropping of the upper clamp ring assembly and applying a vacuum allows the bladder to slacken and pulls the slackened bladder inward adjacent to the exposed portion of the center post. As this occurs, the bladder can be pinched between the end of the fixed-height spacer and the upper clamp ring, thereby cutting the bladder. The bladder may also frequently be pinched if the press malfunctions or the power to the press is lost which typically results in the upper clamp ring dropping. The bladder may also be pinched if the upper clamp ring is dropped through tire curing press operator error. Over time, the bladder tends to be cut after repeated pinching causing the bladder to leak, and not to hold sufficient pressure during the tire curing process. When the bladder leaks, tires tend to be produced which have poor inside finish, poor bead formation or other defects which tend to reduce manufacturing yields and increase the number of defective tires produced. Thus, when the upper clamp ring assembly is raised and the bladder is under vacuum, a portion of the center post of the bladder assembly is exposed which allows for the bladder to be pinched.

U.S. Pat. Nos. 5,393,480 to Pizzorno, and 3,976,409 to Athey disclose conventional tire curing presses, bladder assemblies and tire curing processes and are hereby incorporated by reference. Athey '409 discloses a center mechanism for a conventional tire curing press having a single piece cylindrical sleeve supported on a ledge on the piston rod below the lower clamp ring for limiting the extent of travel of the piston rod. Pizzorno '480 discloses a locating sleeve disposed over the press drive rod between the clamp rings having a pair of semicircular elements.

A disadvantage of conventional spacers is that they tend to leave a portion of the center post exposed and allow the bladder to be pinched, or they tend to require manual adjustment to change the operating position of the upper clamp ring assembly relative to the lower clamp ring assembly.

What is desired, therefore, is a bladder assembly for a tire curing press that limits the extent to which the upper clamp ring assembly is dropped, but does not leave the center post exposed so as to allow the bladder to be pinched between the upper end of the spacer and the upper clamp ring. A spacer that substantially covers the center post of a bladder assembly so as to not leave the center post so exposed is also desired.

SUMMARY OF THE INVENTION

Accordingly it is an object of the present invention is to provide a spacer that extends to cover the center post of a tire curing press bladder assembly during its operation, yet which limits the extent to which the upper clamp ring is dropped.

Another object of the invention to provide a spacer for the center post of the tire curing press bladder assembly that covers the center post during operation of the tire curing press, yet which limits the extent to which the upper clamp ring is dropped.

Still yet another object of the invention is to provide a bladder assembly for a standing post tire curing press having a spacer with the above characteristics.

These and other objectives are achieved by the invention which provides bladder assembly and a spacer for the bladder assembly. More particularly, the invention provides: at least two opposing clamp rings, at least one of which being movably disposed on a center post and having a bladder clamped to them, a first spacer part disposed on the center post and slidable with the movement of the opposing clamp ring assembly to a fully returned position relative to said second spacer part, a second spacer part disposed on the center post adjacent to an opposing clamp ring, and a spring for biasing said first spacer part toward one opposing clamp ring to minimize pinching of said bladder; a first clamp ring placed over the post, a second clamp ring slidable along the post, a bladder clamped to said first and second clamp rings, a first spacer part disposed on the post adjacent said first clamp ring, a second spacer part disposed on the post and slidable within said first spacer part to fully extended and returned positions, and a spring for biasing said second spacer part toward the other of said first and second clamp rings to minimize pinching of said bladder; and at least first and second parts slidable relative to one another having substantially tubular shapes, at least one of said parts having an outer diameter such that at least a portion of said part is returnable within the other of said parts to a fully returned position, and a spring with a spring potential and an inner diameter that is sufficiently large so as to allow one of said parts to extend and return relative to one of said other parts, said spring being disposed so that the spring potential is at its maximum when one of said parts is retracted and is at its minimum when one of said parts is fully extended from the other of said parts.

The invention and its particular features will become more apparent from the following detailed description considered with reference to the accompanying figures.

DETAILED DESCRIPTION OF THE INVENTION

Figure 1:
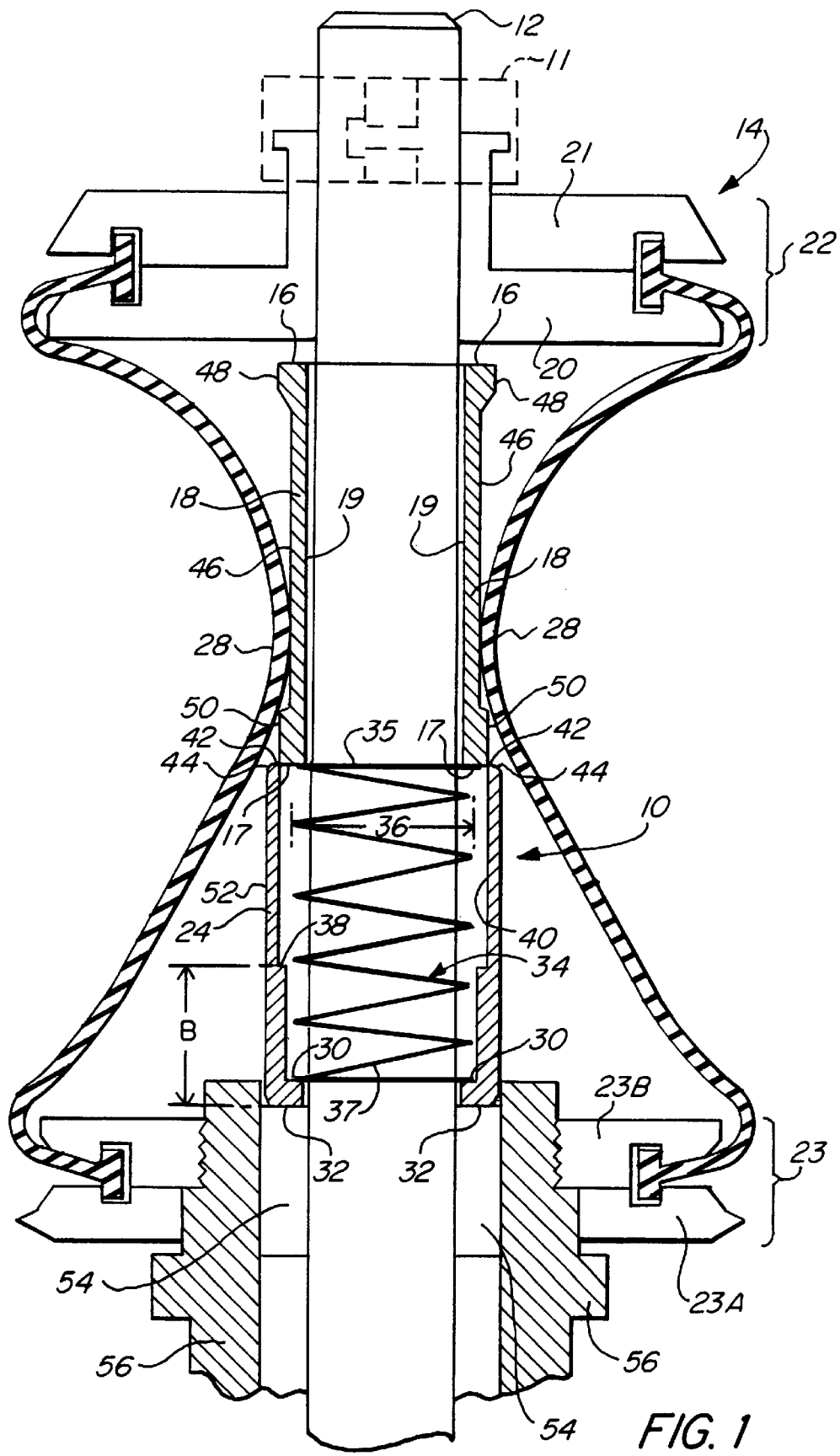
FIG. 1 is a cross-sectional view of the spacer in accordance with the invention.
Figure 2:
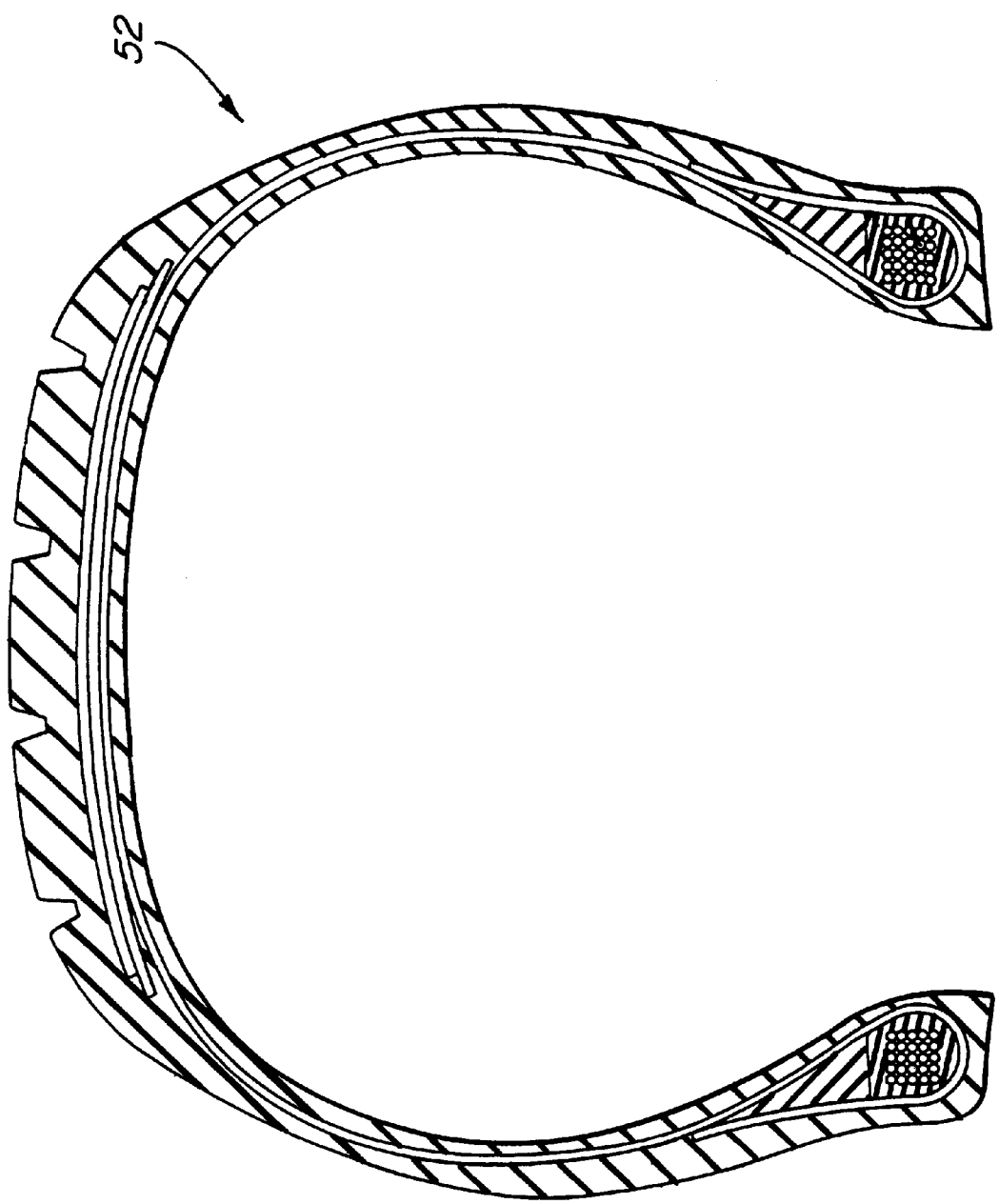
FIG. 2 is a cross-sectional view of a tire made using a conventional tire curing press and the spacer in accordance with the invention.

Spacer 10 is shown in FIG. 1, in its extended position, disposed over center post 12 of tire curing bladder assembly 14 having upper and lower clamp ring assemblies 22 and 23, the upper clamping ring assembly 22 having upper clamp ring 20 and upper mold ring 21, respectively. Collar 11 fixes upper clamp ring assembly 22 to center post 12. When extended, upper end 16 of the upper spacer part 18 is adjacent to the upper clamp ring 20 and which is adjacent to lower spacer part 24. As can be seen in FIG. 1, when spacer 10 is extended, center post 12 is substantially covered by spacer 10 and bladder 28 cannot contact center post 12 or upper end 16 adjacent to upper clamp ring 20. It is critical that inner surface 19 of upper spacer part 18 has an inner diameter such that upper spacer part 18 is slidable along center post 12. It is also critical that upper spacer part 18 has a diameter such that upper spacer part 18 is slidable within lower spacer part 24.

It is understood, however, that lower spacer part 24 may be slidable within upper spacer part 18, and that the function of the spacer parts 18 and 24 relative to each other in FIG. 1 is by way of example only. It is further understood that any type of press may be used having a center post 12 that is oriented in any direction, be it standing or oriented horizontally or other than standing. Thus, this disclosure and the figures for the invention depict clamp ring assemblies 23 and 23 in terms of upper and lower clamp ring assemblies 22 and 23 by way of example only, and it is understood that the function of the clamp rings assemblies 22 and 23 could be reversed, or that the clamp ring assemblies 22 and 23 could be oriented differently than as shown and discussed herein so long as they are capable of supporting a tire 52 and a bladder 28 and of automatically allowing for loading and unloading of the tire 52.

Preferably, as shown in FIG. 1, spring 34 is used as a means for allowing upper spacer part 18 and lower spacer part 24 to extend and return relative to one another and clamp ring assemblies 22 and 23. It is critical that spring 34 has an inner diameter 36 so as to allow spring 34, and, accordingly, upper spacer part 18 to move or slide on post 12 as the clamp ring assemblies 22 and 23 are extended and returned relative to each other. In particular, when upper clamp ring 22 is extended to its primary stacking height, spring 34 forces upper spacer part 18 toward upper clamp ring assembly 22 thereby covering center post 12. Accordingly, when upper clamp ring 22 is dropped to its secondary stacking height, spring allows upper spacer part 18 to return. Spring 34 is disposed between upper and lower spacer parts, 18 and 24, so that the spring potential is at its maximum when upper spacer part 18 is fully returned and is at its minimum when the upper spacer part 18 is fully extended. FIG. 1 shows spring 34 disposed on center post 12 with upper end 35 adjacent to upper spacer part lower end 17, and lower spring end 37 adjacent to flange 30.

It is understood, however, that spring 34 may be disposed on one of said spacer parts, 18 and 24, rather than on the center post 12, and that the configuration shown in FIG. 1 is by way of example only. Thus, any combination of spring 34 and spacer parts 18, 24 may be used so long as parts 18, 24 extend and return relative to one another and clamp ring assemblies 22 and 23.

As shown in FIG. 1, spring 34 may be supported with a spring potential between upper spacer part end 17 adjacent to lower spacer part flange 30. Upper spring end 35 may also be supported at any point along upper spacer part 18 so long as enough spring potential is provided to allow upper spacer part 18 to extend as upper clamp ring assembly 22 extends and to return as upper clamp ring assembly 22 returns. For example, spring 34 may be supported by a step or second flange located at a point other than end 32 or flange 30, determined by the size of spring 34 (i.e., number of coils and diameter of spring 34).

Lower spacer part 24 preferably has a step 38 provided in its inner surface 40. Step 38 is an annular groove provided on inner surface 40 and determines the overall height of spacer 10 in its fully returned position and which prevents spring 34 from being crushed when upper clamp ring assembly 22 is returned. In particular, upper spacer part 18 abuts step 38 when it is returned within lower spacer part 24. Height B of step 38 must be at least the height of spring 34 when it is completely compressed. Preferably, height B is the height of spring 34 when it is completely compressed plus approximately 5.0 mm.

Lower spacer part end 42 adjacent to upper spacer part 18 may have an arcuate edge 44 so as to provide a smooth interface between upper spacer part 18 and lower spacer part 24. Arcuate edge 44 is further desirable so as to further prevent bladder 28 from being pinched, worn or caught by spacer 10. Further, upper spacer part 18 may have a center portion 46 having a slightly smaller diameter than opposing end portions 48 and 50 which further provide a smooth outer surface, in addition to arcuate edge 44. This variation in diameter provided by center portion 46 and opposing end portions 48 and 50 further allows upper spacer part 18 to extend and return and tends to prevent resistance that may arise due to suction or friction. It is understood that the lower spacer part may return within the upper spacer part and if that is so, in that instance, the lower spacer part may have a smaller center portion, and larger end portions, and upper spacer part may have an arcuate edge.

Thus, it is preferred that the outer surface of upper spacer part 18 that is in contact with the lower spacer part 24 be minimized so as to minimize friction and resistance to relative sliding of upper and lower spacer parts 18 and 24. It is also preferred that upper spacer part end portion 48 has a larger diameter than lower spacer part portion 50. This is preferable so that spacer 10 can be inserted into the press in one direction only. More preferably, end portion 50 and inner surface 40 of lower spacer part 24 are machined so that they are smooth and have relatively low resistance to sliding relative to each other.

To prevent pinching of bladder 28, spacer 10 is placed over center post 12. Upper spacer part 18 extends so as to substantially cover center post 12 during operation of the tire curing press. When pressure is applied to bladder 28, bladder 28 extends while the tire 52 is being cured. When the upper clamp ring assembly 22 is in its extended position or its primary stacking height so as to receive a green tire assembly, a vacuum is applied to the bladder 28 and spacer 10 is fully extended so as to prevent bladder 28 from contacting center post 12 when center post 12 is moved down to move the upper clamp ring assembly 22 to the secondary stacking height. Thus, when the bladder assembly 14 is in its retracted position after the tire loader has been removed, spacer 10 also retracts. Lower clamp ring assembly 23 is typically threaded to the lower bead ring support 56 which is movable relative to the center post 12 to allow the lower clamp ring assembly 23 to be raised so as to allow the stripping arms to be placed under the cured tire 52 to remove it. Thus, in this manner, spacer 10 protects the bladder 28 each time a vacuum is applied and the upper clamp ring assembly 22 is dropped.

Spacer parts 18, 24 are preferably tubular in shape and preferably cylindrical. It is understood, however, that spacer parts 18, 24 may be rectangular tubes or any other shape so long as they fit within the bladder 28. Spacer part 24 shown in FIG. 1 rests on the center mechanism floating ring 54 and is adjacent to lower clamp ring assembly 23.

Although the invention has been described with reference to particular dimensions and shapes and the like, these are not intended to exhaust all possible arrangements or features, and indeed many other modifications and variations will be ascertainable to those of skill in the art.

I claim:

1. A bladder assembly for a tire curing press, comprising:
   a bladder clamped to two opposing clamp rings;
   a first spacer part disposed on a center post adjacent to one of said opposing clamp rings;
   a second spacer part disposed on the center post adjacent to the other of said opposing clamp rings;
   said first spacer part being slidable upon movement of the clamp ring adjacent to said first spacer part to a fully returned position relative to said second spacer part; and,
   a spring for biasing said first spacer part toward the clamp ring adjacent to said first spacer part to minimize pinching of said bladder.

2. The bladder assembly according to claim 1, wherein said first spacer part is slidable within said second spacer part.

3. The bladder assembly according to claim 1 wherein said second spacer part further comprises a step on which said first spacer part abuts when said first spacer part is positioned in said fully returned position.

4. The bladder assembly according to claim 3 wherein at least one of said spacer parts further comprises a flange on which said spring is supported.

5. The bladder assembly according to claim 4 wherein said second spacer part contacts one of said opposing clamp rings.

6. The bladder assembly according to claim 5 wherein said first spacer part contacts the other of said opposing clamp rings.

7. A bladder assembly for a tire curing press having a center post, comprising:
   a first clamp ring placed over the post;
   a second clamp ring slidable along the post;
   a bladder clamped to said first and second clamp rings;
   a first spacer part disposed on the post adjacent said first clamp ring;
   a second spacer part disposed on the post and slidable within said first spacer part to fully extended and returned positions; and,
   a spring for biasing said second spacer part toward said second clamp ring to minimize pinching of said bladder.

8. The bladder assembly according to claim 7 wherein said first spacer part further comprises a step on which said second spacer part abuts it in its fully returned position.

9. The bladder assembly according to claim 8 wherein said first spacer part further comprises a flange on which said spring is supported.

10. The bladder assembly according to claim 9 wherein said first spacer part contacts said first clamp ring.

11. The bladder assembly according to claim 10 wherein said second spacer part contacts said second clamp ring.

12. A spacer for a bladder assembly in a tire curing press, comprising:
    at least first and second parts having substantially tubular shapes disposed on a center post and slidable relative to one another, at least one of said parts having an outer diameter such that at least a portion of said one part is returnable within the other of said parts to a fully returned position; and,
    a spring with a spring potential and an inner diameter that is sufficiently large so as to allow one of said parts to extend and return relative to the other of said parts, said spring being disposed so that the spring potential is at its maximum when one of said parts is returned and is at its minimum when one of said parts is fully extended from the other of said parts.

13. The spacer according to claim 12 wherein one of said spacer parts comprises a step on which the other of said spacer parts abuts in its fully returned position.

14. The spacer according to claim 13 wherein at least one of said spacer parts further comprises a flange on which said spring is supported.

15. The spacer according to claim 14 wherein at least one of said spacer parts further comprises an arcuate edge on an outer surface thereof adjacent to a proximal edge of the other of said spacer parts when one of said parts is fully extended from the other of said parts.

* * * * *